Dec. 20, 1960 W. L. HULSLANDER 2,965,123
LUBRICATED PLUG VALVE
Filed Oct. 26, 1954 3 Sheets-Sheet 1
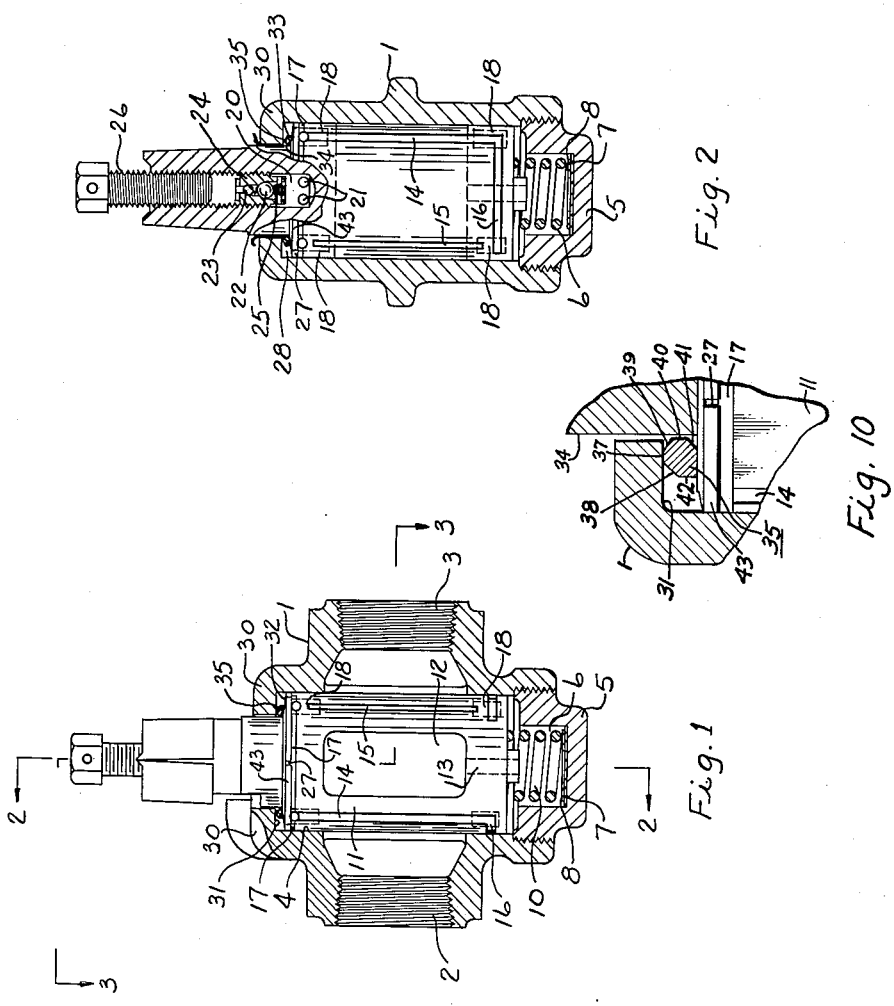
INVENTOR.
WILLIAM L. HULSLANDER
BY
HIS ATTORNEY

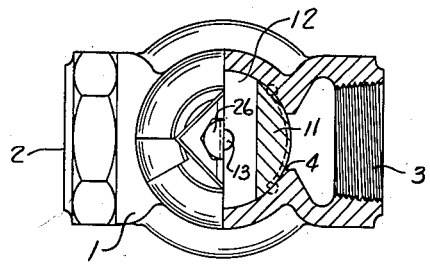
Fig. 3
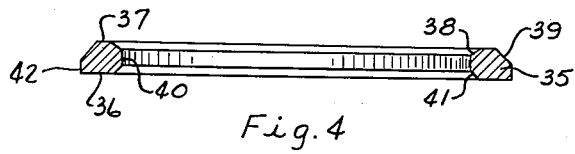
Fig. 4
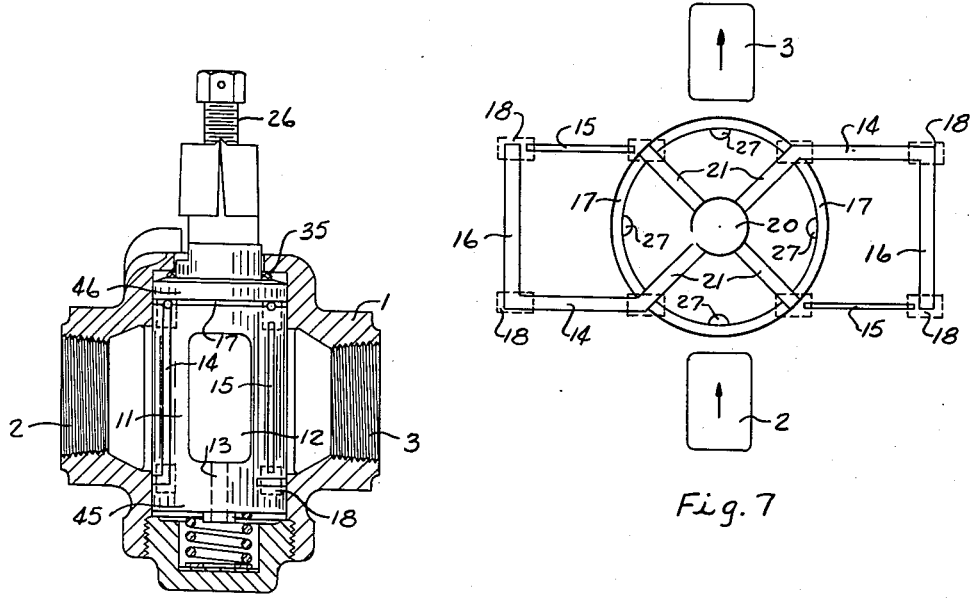
Fig. 7
Fig. 8
INVENTOR.
WILLIAM L. HULSLANDER
BY
HIS ATTORNEY Dec. 20, 1960   W. L. HULSLANDER   2,965,123
LUBRICATED PLUG VALVE
Filed Oct. 26, 1954   3 Sheets-Sheet 3
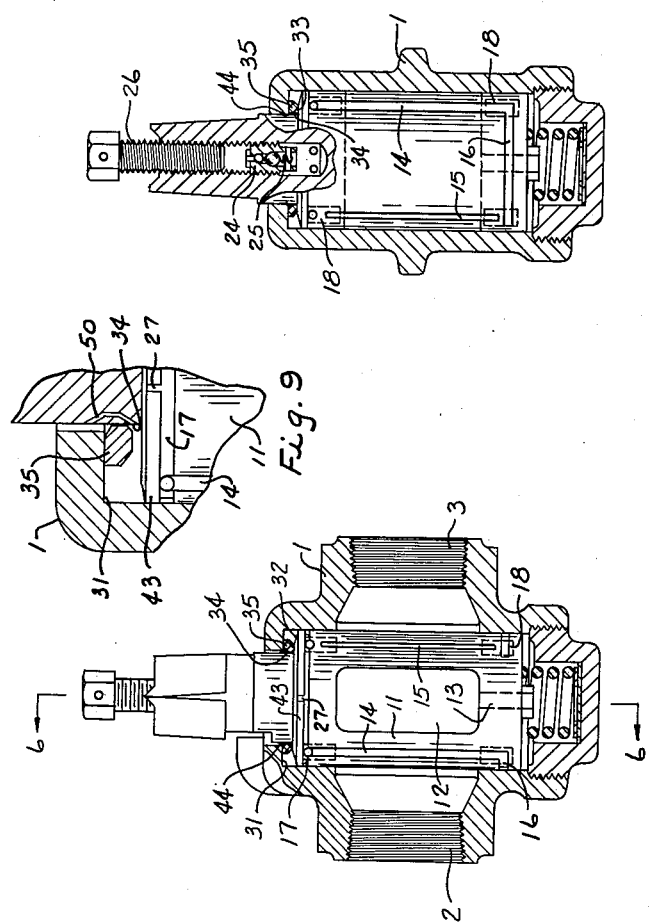
INVENTOR.
WILLIAM L. HULSLANDER
BY
*William D. Carothers*
HIS ATTORNEY

United States Patent Office

2,965,123
Patented Dec. 20, 1960

2,965,123

LUBRICATED PLUG VALVE

William L. Hulslander, Osborne, Pa., assignor to Homestead Valve Manufacturing Company, Coraopolis, Pa., a corporation of Pennsylvania Filed Oct. 26, 1954, Ser. No. 464,736

19 Claims. (Cl. 137—246.17)

This invention relates generally to a lubricated plug valve and more particularly to pressure and seal bearing members having low coefficient of friction for supporting a lubricated plug valve.

Lubricated plug valves are difficult to open and close regardless of whether they have cylindrical or tapered plugs. This invention is directed to improvements in the lubricating system and in a polyfluoroethylene bearing support member at opposite ends of the plug valve.

The plug valve comprising this invention may be either tapered or cylindrical and if the latter, it should have sufficient clearance in the valve chamber to permit the whole face of the plug to be covered with lubricant before the lubricating material fills the head with sufficient lubricant under pressure that it will move the plug down and escape around the stem. To accomplish this lubricating pressure control it is necessary to have a specific type of seal ring. The material may vary but a polyfluoroethylene compressed with a leached glass fiber produces an adequate seal ring. This seal ring forms the bearing member at the stem end of the valve when the plug valve is forced against the head by spring pressure exerted on the other end of the plug valve. This seal ring has a wide bearing surface on one side and a narrow bearing surface bounded by sloping surfaces on its other side. When fitted on a cylindrical surface of the plug with the narrow bearing surface toward the head, it functions as a lubricant ring seal and when the lubricant fills the head and moves the plug valve and ring as a unit away from the head, the lubricant escapes around the stem to show that the plug valve has been properly lubricated, the channel is filled and the whole of the surface covered together with the head being filled. Metering grooves restrict the flow of lubricant to the head until the whole of the surface of the plug valve has been properly lubricated. When the plug valve moves against its spring support the seal ring leaves its bearing contact with the head and the lubricant escapes around the stem indicating that the head as well as the whole plug valve surface is lubricated.

This lubricating system may be made automatic by inverting the seal ring washer to place the narrow bearing surface toward the plug valve and the broad bearing surface against the valve head by spring pressure from the opposite end of the plug valve. A taper to smaller diameter at the outer end of the cylindrical surface on the valve plug permits the lubricant to maintain the sealing ring against the head while the plug valve moves away from the head thus leaving a greater supply of lubricant in the head until the taper reaches the bore of the ring which allows the lubricant to escape around the stem. The spring thus maintains pressure on the lubricant in the head and feeds it back to the valve until it is depleted and the plug valve again engages the seal ring.

The taper on the valve stem may be substituted by a vent passage that would start at the same position as that of the taper and come out of the stem where it is visible. The passage may be closed between its ends or it may be a channel.

The large pressure force on the bottom of the plug member in this valve redistributes the lubricant throughout the lubricant system and on the surface of the plug member. The restricted passages or grooves now act to feed the lubricant when needed but cannot totally discharge the lubricant system.

Other objects and advantages of this improved lubricated plug valve appear hereinafter in the following description and claims.

The accompanying drawings show for the purpose of exemplification without limiting the invention or claims thereto certain practical embodiments illustrating the principles of the invention wherein:

Fig. 1 is a view in vertical section of the plug valve comprising this invention and the vents in the valve body.

Fig. 2 is a view in vertical section taken on the line 2—2 of Fig. 1.

Fig. 3 is a view in horizontal section taken on the line 3—3 of Fig. 1.

Fig. 4 is an enlarged sectional view of a seal ring comprising this invention.

Fig. 5 is a view in vertical section of the plug valve as shown in Fig. 1 with the seal ring inverted.

Fig. 6 is a view in vertical section taken on the line 6—6 of Fig. 5.

Fig. 7 is a diagrammatic layout of the lubricant channels.

Fig. 8 is a view in elevation of a modified form of plug valve.

Fig. 9 is an enlarged view of the automatic lubricating valve shown in Fig. 5.

Fig. 10 is an enlarged view of the lubricating check ring as shown in Figs. 1 and 2.

Referring to Figs. 1 to 7 of the drawings, the plug valve housing or body 1 is vented at 2 and 3 to the valve chamber 4. The bottom of the valve chamber is closed by the screw plug 5 which has a pocket 6 to receive the bearing disc or washer 7 made of polyfluoroethylene. A steel washer 8 rides on top of the low friction washer 7 and supports the lower end of the spring 10 the upper end of which engages the bottom of the plug 11.

The plug shown is a single piece cylindrical member having the port 12 that mates with the vents 2 and 3 of the body 1. The port 12 is usually connected to the space at the plug 5 by the passage 13. This places line pressure at the bottom of the plug valve when the port connects the two vents. The line pressure aids the spring in exerting an upward pressure on the plug valve both of which are defined in the claims as pressure means.

The surface of the plug valve has four vertical or longitudinal channels, two large channels numbered 14 and two smaller channels numbered 15. The smaller channels 15 pass the ports of the vents 2 and 3 as the plug valve is moved from the open to closed positions. An arcuate channel 16 extends from the bottom of each large channel 14 around the blank surfaces of the plug valve. An annular feed groove 17 is a restricted groove and connects the tops of the large channels 14. The small channels 15 lie short of the arcuate grooves 16 and short of the annular feed groove 17 but are connected to both through the jumper grooves 18 in the wall of the valve chamber. The annular groove 17 is connected to the bore 20 by the radial grooves 21. The bore 20 has fitted therein the tandem ball check valves 22 and 23 housed in the cage 24 and biased to their closed position by the springs 25. The outer end of the bore 20 has the lubricant pressure screw member 26. The lubricant is a homogeneous viscous synthetic lubricant especially compounded for hydrocarbon service and a similar synthetic lubricant for acids, caustics, and alkaline solutions. It is in the form of a small cylinder that fits in the bore 20 and when compressed by the screw 26 flows past the double check valves out the radial passages 21 to the annular distributing groove 17 where it flows through all of the channels and then over the whole surface of the valve. The plug valves are given clearance in their chambers to permit this distribution of lubricant and prevent any metal to metal contact between the plug valve and the body. In valves from one-half to two inch size the clearance is .001" to .002". In two and one-half inch to six inch valves the clearance is .002" to .003" and in eight to fourteen inch valves the clearance is .003" to .005". Thus there is always clearance in which to flow the lubricant. This lubricant is new and an ordinary oil or grease would not stand up in this use.

After the lubricant has filled the two oppositely disposed and closed loops formed by the channels 14, 15, 16, and 17 and the jumpers 18, the lubricant spreads out over the surface of the plug valve and fills the clearance covering the whole of the cylindrical surface of the plug valve. After this takes place the lubricant then seeps its way up through the four metered slots 27 in the top of the plug valve allowing the lubricant to flow into the head chamber 28. The head 30 of the valve may or may not be removable. It provides an annular surface 31 which opposes the annular surface 32 on the top of the plug valve.

The plug valve has the shoulder 33 forming the cylindrical surface 34 on which the seal ring 35 fits. The seal ring is shown in Fig. 4 and is provided with the wide bearing face 36 and the narrow bearing face 37 on opposite sides of the ring. The latter or narrow bearing face is bounded by the inner and outer sloping sides 38 and 39 respectively which form that portion of the ring in a frusto conical cross section. The inner sloping surface 38 is smaller than the outer sloping surface 39. The ring has a cylindrical bore 40 which fits on the cylindrical portion 34 of the plug valve. One end of the bore is beveled as at 41 and the other end is beveled as at 38 to allow the ring to slide on the cylinder 34. The outer cylindrical face of the ring as shown at 42 is the greatest perimetral surface of the ring.

This seal ring is made of polyfluoroethylene compressed with a leached glass fiber or a nitrated glass fiber. These materials are intermixed and then compressed into a sleeve which is fired to sinter the material at a temperature of 650° to 700° F. The rings are then machined to size and shape. This material will not cold flow under 8,000 p.s.i. The leached glass fibers crush to fine powder of SiO when compressed. This material also has a low coefficient of friction and when seated on the plug valve and against the under surface 31 of the valve head the valve is supported at both ends by polyfluoroethylene, in the ring 35 and the ring 7. Thus the spring 10 maintains the bearing surface of the rings 7 and 35 in contact with the body parts of the valve. The low coefficient of friction of these rings permits the spring 10 to rotate with the plug valve thereby relieving the torsion on the spring and prolonging its life. The plug valve has a very low turning torque due to these rings and the lubricant coating.

The metering passages 27 may or may not be in the surface of the plug valve and do not allow the lubricant in the head until the whole of the valve surface has been coated with lubricant. The size of these metering vents 27 determines their function. When the lubricant finally escapes to the valve head chamber 28 and fills the same this chamber functions as a seal to block the flow of fluid from the valve to the stem. This seals the top of the valve plug. The annular distributing groove 17 also functions as an annular seal in tandem with the seal formed by the lubricant in the chamber 28. These two lubricant seals are spaced by the annular land 43 and the land below the groove 17 which are also coated with lubricant. Thus the stem of the plug valve is well sealed by a series of four annular sealing means.

The seal ring 35 is shown in Figs. 1 and 2 as the small or narrow bearing surface 37 toward the valve head and in contact therewith by the pressure of the spring 10 plus the line pressure acting on the bottom of the valve plug if the valve is open. As the lubricant fills the head chamber 28 and exerts a pressure therein, this pressure is effective on the top of the plug valve as well as the sloping or frusto conical surface 39 of the seal ring. When the lubricant pressure exceeds the line pressure and then spring pressure 10, the washer 35 and the plug valve 11 move down further compressing the spring and the lubricant then escapes above the washer 35 and out around the stem where it can be seen. This is a visual check that the valve is properly lubricated.

To convert this valve into one having an automatic lubricating system the washer or ring seal 35 is inverted placing the narrow bearing surface 37 on the plug valve and the broad bearing surface against the annular surface 31 of the head 32 as shown in Figs. 5, 6 and 9. With this seal ring inverted the lubricant pressure keeps it against the head as the plug valve is moved down in the chamber. The upper end of the cylindrical surface 34 tapers to a smaller diameter to provide an escape as indicated at 44 in Figs. 5 and 6 at the passage 50 as shown in Figs. 9 and 10. Both the taper 44 and the passage 50 are lubricant vents. When the plug valve 11 moves down, the seal ring 35 slides up the cylindrical surface 34 upon filling the head chamber 28 with lubricant. The length of the cylindrical surface thus determines the volume of the chamber 28. When the tapered surface 44 or the passage 50 reaches the seal ring 35 the lubricant escapes around the stem where it may be seen until the plug valve 11 again rises to bring the seal ring back onto the cylindrical surface 34. This stops any more flow of lubricant from the head chamber 28 and the lubricant stored therein is subject to the pressure of the spring 10 and the line pressure, and the lubricant may flow back down into the valve chamber to replenish the channels and the surface of the plug valve until the plug valve again raises the seat against the seal ring 35. This provides automatic lubrication for the full distance of the cylindrical surface 34 and measures the lubricant available for distribution.

Referring to Fig. 8 the valve structure and the seal ring 35 are the same, the only difference is the increase of the end lands, as illustrated by the lower land 45 and the upper land 46. These lands have the same clearance as the plug valve and are covered with lubricant but function as the metered passage between the groove 17 and the chamber with their greater widths in combination with the type of seal ring 35. The wide bearing face 36 is adjacent the valve head and the movement of the plug valve up and down in the valve chamber in the ordinary operation of the valve leaves the seal ring 35 as shown in Fig. 9 which is inverted to provide an automatic lubricating system. These wide land sections provide extra seal resistance to the annular seals of the lubricant on both sides of the top land 46.

The materials employed in valves of this character are different owing to the type of seals and the coverage of the sealing surface. The special lubricant permits this type of material as well as the structure. Aluminum valve body and valve plugs are used for gasoline, oil, benzol, and similar hydrocarbon products. Semisteel and cast iron are used for distilled and general water steam and soaps, mild acids, and alkalines. If the latter is to be employed at high temperatures the steel and iron are replaced by high carbon steel. Brass and bronze are used for salt water, and certain acids of this class and liquor. Monel is employed for citrus juices, certain acids of this class, food products, hot or cold. However, the structure and sizes are the same as disclosed and no galling can be detected.

I claim:

1. A lubricant check ring comprising compressed and sintered mixture of leached glass fiber and polyfluoroethylene.

2. A plug valve comprising a body, a plug valve therein, a spring in the end of said valve body urging the plug valve in one direction, and a low friction plug valve support comprising a flat member of polyfluoroethylene seated in the body under said spring.

3. A plug valve comprising a vented valve body having a valve chamber, a plug valve in said chamber and having a projecting stem, a spring in said valve body urging said plug valve in one direction, and a polyfluoroethylene bearing member between said valve body and said spring and a polyfluoroethylene ring with leached glass fibers between said valve body and said plug valve on the opposite side of the plug valve from said spring to provide for low turning torque for said plug valve.

4. A lubricated valve comprising a vented valve body having a valve chamber, an annular head at one end of said chamber, a plug valve in said chamber and having a stem projecting through said head, a polyfluoroethylene bearing member at the other end of said chamber, a spring means between said bearing member and said plug valve, an annular shoulder on said plug valve and forming a cylindrical surface, and a lubricant check ring of polyfluoroethylene with leached glass fibers fitting on said cylindrical surface and forming a bearing ring between the other end of said plug valve and said valve head.

5. A lubricated valve comprising a vented valve body having a valve chamber, an annular head at one end of said chamber, a plug valve in said chamber and having a stem projecting through said head, spring means between said valve body and said plug valve to urge it toward said head, an annular shoulder on said plug valve and forming a cylindrical surface, and a lubricant check ring of polyfluoroethylene with leached glass fibers fitting said cylindrical surface and having opposite wide and narrow bearing surfaces, said spring means holding said check ring between said head and said shoulder.

6. The structure of claim 5 characterized in that the narrow bearing surface of said check ring is adjacent said head.

7. The structure of claim 5 characterized in that the wide bearing surface of said check ring is adjacent said head and the outer end of said cylindrical surface tapers to a smaller diameter.

8. A lubricated plug valve comprising a valve body having ports connected to a valve chamber, a head at one end of said body having an opening surrounded by an annular surface forming a part of said chamber, a valve plug in said chamber having a port to cooperate with the ports in said valve body and having a stem projecting through the opening in said head, an annular surface on the end of said valve plug opposed to said annular surface on said head, a cylindrical surface on said stem adjacent to said annular surface on said plug, a pressure lubricant check ring of polyfluoroethylene interspersed with leached glass fibers having an outer cylindrical surface and a cylindrical bore with a sliding fit on the cylindrical surface of said stem, an annular bearing face on one side of said ring and a second annular bearing face on the opposite side of said ring to engage and cooperate with said opposed annular surfaces on said head and said valve plug, one of said bearing faces on said ring being wider than the other of said faces, outer and inner annular sloping sides bounding the outer and inner edges of said narrow bearing face of said ring to space said narrow bearing face from said cylindrical bore and from said outer cylindrical surface, said outer cylindrical surface being the greatest perimetral surface of said check ring, and said annular perimetral surface connecting the wider of said annular bearing faces with said outer sloping side.

9. A pressure lubricant check ring comprising an annular ring of polyfluoroethylene interspersed with leached glass fibers having a cylindrical bore, an annular bearing face on one side of said ring, a second annular bearing face on the opposite side of said ring, said first annular bearing face being wider than said second annular face, outer and inner sloping sides bounding the outer and the inner edges of said second annular bearing face to space said second bearing face from the greatest perimetral surface of the check ring and from its bore respectively, said annular perimetral surface connecting said first annular bearing face with said outer sloping side.

10. The check ring of claim 9 characterized in that said outer sloping side is wider than said inner sloping side.

11. The check ring of claim 9 characterized in that the lower edges of said sloping sides terminate in said bore and said annular perimetral surface and spaced from the plane of said first annular bearing face.

12. The check ring of claim 9 characterized in that the inner edge of said first annular bearing face is chamfered toward said cylindrical bore.

13. A lubricant check ring of compressed polyfluoroethylene interspersed with leached glass fibers having a cylindrical bore and flat annular bearing faces, one annular bearing face being wider than the other annular bearing face.

14. A lubricated valve for a viscous lubricant comprising a vented valve body having a valve chamber, an annular head at one end of said chamber, a plug valve in said chamber having a port passing therethrough and a stem projecting through said head, pressure means between said plug valve and said body to urge said plug valve toward said head, a longitudinal surface lubricating channel in said plug valve on each side of each port opening, an annular groove in the surface of said plug valve to connect with said channels when assembled, radical lubricant supply passage means to feed lubricant to said annular groove and thence to said channels, an annular surface on the top of said plug valve, a cylindrical surface on said stem adjacent to said annular surface, a lubricant chamber formed between said annular surface on said plug valve and said head, a pressure and lubricant check ring of polyfluoroethylene interspersed with leached glass fibers having a bore with a sliding fit on said cylindrical surface and its sides having opposite bearing faces to cooperate with said head and said annular surface on said plug valve, one of said bearing faces being wider than the other, and metering channels from said annular groove to said lubricant chamber offset from said longitudinal channels and from said radial supply passage means, said metering channels being sufficiently restricted to require the lubricant to cover said plug valve surfaces and fill said channels and grooves before flowing to said lubricant chamber.

15. The lubricated valve of claim 14 characterized in that the narrow bearing surface of said check ring is adjacent said head.

16. The lubricated valve of claim 14 characterized in that said wide bearing surface is adjacent said head and the outer end of said cylindrical surface on said stem tapers to a smaller diameter.

17. A lubricated valve for a viscous lubricant comprising a valve body having a valve chamber with connecting body ports, a valve plug member with a stem in said chamber and having a port to cooperate with said body ports, a sealing ring of polyfluoroethylene interspersed with leached glass fibers and having opposite wide and narrow bearing surfaces and the bore slidably fitting said stem, the wide bearing surface of said ring being inverted and seating on the valve body member and surrounding the valve stem to cooperate with said valve body and form a lubricant chamber, a longitudinal lubricant groove in the surface of said valve plug member spaced from each side of said valve port, a restricted annular lubricant groove in the surface of said valve plug member above said plug port and having connection with the upper ends of said longitudinal grooves, means for delivering viscous lubricant under pressure through a passage to said restricted annular groove for distribution to said longitudinal grooves and under the face of said valve plug member, and a restricted metering passage in said plug valve member connected between said restricted annular groove and said lubricant chamber and in spaced relation to the longitudinal grooves and said lubricant delivery passage, said restricted annular groove and said restricted metering passage being gauged to prevent the flow of lubricant through the latter until the surface of the plug is coated with lubricant and the longitudinal grooves are pressurized with lubricant.

18. A lubricated valve for a viscous lubricant comprising a valve body having a valve chamber with connecting body ports, a valve plug member with a stem in said chamber and having a port to cooperate with said body ports, a sealing ring surrounding the valve stem to cooperate with said valve body and form a lubricant chamber, a longitudinal lubricant groove in the surface of said valve plug member spaced from each side of said valve port, a restricted annular lubricant groove in the surface of said valve plug member above said plug port and having connection with the upper ends of said longitudinal grooves, means for delivering viscous lubricant under pressure through a passage to said restricted annular lubricant groove in the surface of said valve plug member above said plug port and having connection with the upper ends of said longitudinal grooves, means for delivering viscous lubricant under pressure through a passage to said restricted annular groove for distribution to said longitudinal grooves and under the face of said valve plug member, and a restricted metering passage in said plug valve member connected between said restricted annular groove and said lubricant chamber and in spaced relation to the longitudinal grooves and said lubricant delivery passage, said restricted annular groove and said restricted metering passage being gauged to prevent the flow of lubricant through the latter until the surface of the plug is coated with lubricant and the longitudinal grooves are pressurized with lubricant, said sealing ring is a lubricant check ring of polyfluoroethylene interspersed with leached glass fibers and having opposite wide and narrow bearing surfaces and a bore slidably fitting said stem, the wide bearing surface of said ring seating on the top of said valve plug member.

19. The valve of claim 17 characterized in that said sealing ring is a lubricant check ring having opposite bearing faces, the bearing face on one side being wider than the bearing face on the other side, the bore of said check ring slidably fits said stem, a lubricant vent passage carried by said stem and controlled by said check ring, and a spring to supply pressure against the bottom of said valve plug member.

References Cited in the file of this patent

UNITED STATES PATENTS

| | | |
|---|---|---|
| 1,778,746 | Bard | Oct. 21, 1930 |
| 2,038,887 | Clade | Apr. 28, 1936 |
| 2,038,889 | Clade | Apr. 28, 1936 |
| 2,069,998 | Clade | Feb. 9, 1937 |
| 2,389,670 | Kerr | Nov. 27, 1945 |
| 2,552,376 | Haun | May 8, 1951 |
| 2,616,657 | Martin | Nov. 4, 1952 |
| 2,651,490 | Clade | Sept. 8, 1953 |
| 2,661,019 | Snyder | Dec. 1, 1953 |
| 2,699,798 | Hawkins | Jan. 18, 1955 |
| 2,715,412 | Clade | Aug. 16, 1955 |
| 2,718,665 | Clade | Sept. 27, 1955 |
| 2,747,905 | Clade | May 29, 1956 |

OTHER REFERENCES

Chemical Age; pp. 10–14, Jan. 1, 1949 (TP–1–C36), published by Benn Brothers, Ltd. (Copy in Scientific Library and Div. 39.)